United States Patent Office 3,038,938
Patented June 12, 1962

3,038,938
N-PHENYL-N-TRIFLUOROMETHYL-
ALKANAMIDES
Travis E. Stevens, Evansville, Ind., assignor to Rohm & Haas Company, Philadelphia, Pa., a corporation of Delaware
No Drawing. Filed Feb. 15, 1961, Ser. No. 89,352
10 Claims. (Cl. 260—562)

This invention concerns fluorine-containing alkanamides of the following formula

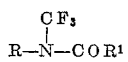

in which R is selected from the group consisting of alkyl, aryl, alkaryl, halogen-substituted aryls and substituted aryl selected from the group consisting of p-nitrophenyl and p-acetylphenyl, and R¹ is lower alkyl containing 1 to 4 carbon atoms. It also concerns processes for the preparation of such compounds.

The compounds of the present invention are prepared by reacting bis(N-substituted-N-trifluoromethylamino) sulfides of the general formula

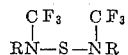

in which R is as defined hereinbefore with acid halides or acid anhydrides of the formula

in which X is fluoride, chloride or bromide and

in which R¹ is as defined hereinbefore. A small amount of a strong acid is used as a catalyst.

The preparation of bis(N-substituted-N-trifluoromethylamino) sulfides is set forth in Serial No. 21,582, filed April 12, 1960, and in the hands of the same assignee and the information therein is incorporated herein by reference. The method of preparation comprises reacting at a temperature of from 40° C. to 150° C. an isothiocyanate of the following formula

in which R is as defined hereinbefore with iodine pentafluoride, IF₅, and isolating the substituted aminosulfide so formed. Suitable bis(N-substituted-N-trifluoromethylamino) sulfides include those of the general formula

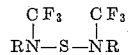

in which R is ethyl, butyl, t-octyl, octadecyl, phenyl, tolyl, p-fluorophenyl, p-chlorophenyl, p-bromophenyl, p-iodophenyl, p-ethylphenyl, p-nitrophenyl, and p-acetophenyl. R may also be cyclohexyl. These compounds give the corresponding N-substituted N-trifluoromethyl alkanamides.

The acid halides and acid anhydrides employed as the other reactant are standard articles of commerce. Because of reactivity and availability, the acid chlorides represent the preferred halides and suitable acid chlorides include acetyl chloride, propionyl chloride, butyryl chloride and valeryl chloride. The acid anhydrides corresponding to the above noted acid chlorides are those suitable for use in the processes of the present invention.

While it is possible to use a solvent which is inert under the reaction conditions, the preferred embodiment does not employ an additional solvent, but does employ an excess of the acid chloride or acid anhydride which functions not only as a solvent but also promotes increased yields of product and utilizes the much less readily available aminosulfide more effectively. While in theory only one mole of acid chloride or 0.5 mole of acid anhydride is required per mole of aminosulfide, large excesses are preferably employed. Thus, from 3 to 15 moles of acid chloride or anhydride may be used per mole of aminosulfide with 5 to 10 moles per mole of aminosulfide being preferred. The excess of chloride or anhydride remaining at the completion of the reaction can be destroyed by hydrolyzing with water or by pouring the reaction mixture onto ice.

After dissolving the aminosulfide in an excess of the acid chloride or acid anhydride, a small amount of strong mineral acid is added to the solution. Concentrated sulfuric acid is preferred, and although the amount is not critical, a volume of concentrated sulfuric acid about equal to one-tenth the volume of the acid chloride or anhydride is generally used.

The reaction temperature will vary with the acid chloride or anhydride used and the lower members, such as acetyl chloride or acetic anhydride will react readily at ambient temperatures. The higher members will require heating to temperatuer as high as 100° C. in order to complete the reaction in a reasonable period of time. The reaction temperature ranges from 20° C. to 100° C.

As in the case of the reaction temperature, the time required for completion of the reaction will vary with the particular compounds being used. It will also vary with the reaction temperature. With the chloride and anhydride of acetic acid, the reaction was complete in two hours at ambient temperatures. With valeryl chloride at 100° C., the reaction was complete in 30 minutes.

The reaction should be carried out under anhydrous conditions. After hydrolysis, solvents are added to the mixture and the solvent layer containing the product is separated from the aqueous layer and dried over a desiccant, such as anhydrous magnesium sulfate. Particularly suitable solvents are chlorinated hydrocarbons such as methylene chloride. Removal of the solvent from the dried solution gives the product. Recrystallization may be required to remove traces of impurities and a hydrocarbon solvent such as hexane can be used.

The compounds of the present invention are of value as fungicides. As indicative of the fungicidal activity of this class of compounds, N-trifluoromethyl-4-iodoacetanilide was tested against *Alternaria solani, Monilinia fructicola,* and *Stemphylium sarcinaeforme.* The method utilized for the determination of fungitoxic activity was one standardized by the American Phytopathological Society Committee on Standardization of Fungicidal Tests. All details of this test are presented on pages 627–632, volume 33 of Phytopathology, July 1943.

The series of dilutions for this test were prepared by dissolving 1 gram of each of the compounds in 20 cc. of acetone and then adding 79 cc. of water to make a 1% solution of the compound. This stock solution was then serially diluted with water to concentrations of 0.1%, 0.02%, and 0.005%.

A spore suspension of *Monilinia fructicola, Alternaria solani,* and *Stemphylium sarcinaeforme* in an amount of 0.5 cc. was added to 2 cc. of each of the different serial dilutions and 4 drops of each of the resulting suspensions were pipetted onto individual cellulose nitrate coated glass slides. These slides were then placed in large Petri plates, sealed with water, and held at a constant temperature for a period of 16 to 24 hours, at which time the percentage of spores showing no germination was determined. This was done by counting 25 spores in the center of each of the 4 drops on each slide with the proper correction being made for non-viable spores as determined by the control (untreated) slides in each chamber. *Alternaria solani* and *Stemphylium sarcinaeforme* spores were standardized to 5,000 and *Monilinia fructicola* to 10,000 per ml. in these tests. The data obtained were then plotted on logarithmic probability paper and straight line curves were drawn by inspection. The $ED_{50}$ values were determined by extrapolation. This value is the concentration at which 50 percent of the test spores would be prevented from germinating.

The results of these tests were as follows.

| Fungus: | $ED_{50}$ (in p.p.m.) |
|---|---|
| Alternaria solani | 50–200. |
| Monilinia fructicola | 10–50. |
| Stemphylium sarcinaeforme | Less than 1. |

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

A mixture of 5.0 grams of bis(N-p-chlorophenyl-N-trifluoromethylamino) sulfide, 25 ml. of acetic anhydride and 2.0 ml. of concentrated sulfuric acid was agitated and allowed to stand at ambient temperature for two hours. The mixture was then poured into 200 ml. of water and stirred one hour. The aqueous mixture was extracted with methylene chloride; these organic extracts were washed with 10% aqueous sodium bicarbonate and with water and dried over magnesium sulfate. Evaporation of the methylene chloride left 5.21 grams (93%) of N-trifluoromethyl-N-(p-chlorophenyl) acetamide as an oil. This oil was recrystallized from hexane to give the solid acetamide, 3.73 grams, M.P. 42–43° C. (Analysis as shown in Example III.)

EXAMPLE II

A mixture of 1.0 gram of the above bis(N-p-chlorophenyl-N-trifluoromethylamino) sulfide, 5.0 ml. of acetyl chloride and 0.25 ml. of concentrated sulfuric acid was allowed to stand at ambient temperature for two hours. The mixture was poured onto ice and then was extracted with methylene chloride. Evaporation of the methylene chloride left 1.07 gram of N-trifluoromethyl-N-(p-chlorophenyl) acetamide, M.P. 42–43° C. after recrystallization from hexane.

EXAMPLE III

Employing the methods of Examples I and II, the N-substituted N-trifluoromethyl acetamides shown below were prepared:

*N-Substituted-N-Trifluoromethyl Acetamides*

| R | M.P., degrees | Analysis Calculated | | | Analysis Found | | |
|---|---|---|---|---|---|---|---|
| | | C | H | N | C | H | N |
| p-Fluorophenyl | (a) | 48.88 | 3.19 | 6.33 | 49.21 | 3.81 | 6.35 |
| p-Bromophenyl b | 52 | 38.32 | 2.50 | 4.96 | 38.38 | 2.43 | 4.64 |
| p-Iodophenyl c | 59 | 32.85 | 2.15 | 4.25 | 33.29 | 2.27 | 4.20 |
| p-Tolyl | 34 | 55.30 | 4.64 | 6.45 | 54.44 | 4.77 | 6.35 |
| p-Chlorophenyl | 43 | 45.49 | 2.97 | 5.89 | 45.30 | 3.23 | 5.68 | a $n_D^{20}$ 1.4482.
b F: calc'd, 20.21; found, 20.29.
c F: calc'd, 17.32; found, 16.53.

EXAMPLE IV

An equimolar quantity of valeryl chloride was substituted for the acetyl chloride of Example II and the reaction mixture was heated to 100° C. for 30 minutes. It was cooled and poured onto ice. The mixture was extracted with chloroform and the chloroform solution was separated from the aqueous layer, washed with dilute sodium carbonate solution then with water and dried over magnesium sulfate. Evaporation of the chloroform left the product, N-trifluoromethyl-N-p-chlorophenyl valeramide, as a substantially pure compound.

EXAMPLE V

Using the method as set forth in Example I, an equimolar amount of bis(N-n-heptyl-N-trifluoromethylamino) sulfide was substituted for the bis(N-p-chlorophenyl-N-trifluoromethylamino) sulfide. N - trifluoromethyl - N-n-heptyl acetamide was obtained in good yield.

EXAMPLE VI

Using the method set forth in Example II, and employing the corresponding substituted aminosulfides, N-trifluoromethyl-N-phenyl acetamide and N-trifluoromethyl-N-n-butyl acetamide were prepared in good yield.

I claim:
1. N-trifluoromethyl-N-(p-nitrophenyl) butyramide.
2. N-trifluoromethyl-N(p-chlorophenyl) acetamide.
3. N-trifluoromethyl-N-(p-bromophenyl) propionamide.
4. N-trifluoromethyl-N-phenyl acetamide.
5. A process for the preparation of N-substituted-N-trifluoromethyl alkanamides of the following formula

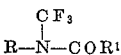

in which R is selected from the group consisting of alkyl, aryl, alkaryl, halogen substituted aryls and substituted aryl selected from the group consisting of p-nitrophenyl and p-acetylphenyl, and $R^1$ is lower alkyl containing 1 to 4 carbon atoms, which comprises reacting in the presence of a strong mineral acid aminosulfide compounds of the following formula:

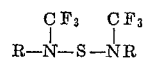

in which R is as defined hereinbefore with a compound selected from the group consisting of $$R^1COCl$$
and
$$R'COOOCR'$$

in which $R^1$ is lower alkyl containing 1 to 4 carbon atoms and recovering the N-N-substituted trifluoromethyl alkanamide so formed.

6. A process as set forth in claim 5 in which the reaction temperature is from 20° C. to 100° C.
7. A process as set forth in claim 5 in which the molar ratio of the aminosulfide to the compound selected from the group consisting of acid chloride and acid anhydride is from 1 to 1 to 1 to 15.
8. A process as set forth in claim 5 in which the molar ratio of the aminosulfide to the compound selected from the group consisting of acid chloride and acid anhydride is from 1 to 5 to 1 to 10.
9. A process as set forth in claim 5 in which the strong mineral acid is concentrated sulfuric acid.
10. A process as set forth in claim 9 in which the concentrated sulfuric acid is present in the volume equivalanet to about one-tenth the volume of the compound selected from the group consisting of acid chloride and acid anhydride.

References Cited in the file of this patent
UNITED STATES PATENTS

| 2,521,902 | Coover et al. | Sept. 12, 1950 |
| 2,585,230 | Coover et al. | Feb. 12, 1952 |
| 2,691,043 | Husted et al. | Oct. 5, 1954 |
| 2,743,297 | Husted et al. | Apr. 24, 1956 |
| 2,957,914 | Halpern et al. | Oct. 25, 1960 |